(12) United States Patent
West et al.

(10) Patent No.: US 8,179,127 B2
(45) Date of Patent: May 15, 2012

(54) METHOD AND APPARATUS TO MONITOR POSITION OF A ROTATABLE SHAFT

(75) Inventors: Stephen T. West, New Palestine, IN (US); Sean E Gleason, West Bloomfield, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 620 days.

(21) Appl. No.: 12/245,790

(22) Filed: Oct. 6, 2008

(65) Prior Publication Data

US 2009/0115408 A1    May 7, 2009

Related U.S. Application Data

(60) Provisional application No. 60/985,737, filed on Nov. 6, 2007.

(51) Int. Cl.
*G01B 7/30* (2006.01)
(52) U.S. Cl. .................................. 324/207.25
(58) Field of Classification Search .................. None
See application file for complete search history.

(56) References Cited

U.S. PATENT DOCUMENTS

| | | | |
|---|---|---|---|
| 4,972,332 A * | 11/1990 | Luebbering et al. | 324/207.25 |
| 6,087,829 A * | 7/2000 | Jager | 324/207.25 |
| 6,483,270 B1 | 11/2002 | Miyazaki | |
| 6,674,261 B2 | 1/2004 | Takahashi | |
| 6,832,148 B1 | 12/2004 | Bennett | |
| 6,868,318 B1 | 3/2005 | Cawthorne | |
| 6,894,454 B2 | 5/2005 | Patel | |
| 6,946,808 B2 | 9/2005 | Kandori | |
| 6,984,954 B2 | 1/2006 | Leonardi | |
| 7,064,504 B2 | 6/2006 | Imai | |
| 7,154,236 B1 | 12/2006 | Heap | |
| 7,307,415 B2 * | 12/2007 | Seger et al. | 324/207.2 |
| 7,881,567 B2 * | 2/2011 | Bosselmann et al. | 385/13 |
| 2003/0218458 A1 * | 11/2003 | Seger et al. | 324/303 |
| 2005/0007044 A1 | 1/2005 | Qiu | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |

(Continued)

OTHER PUBLICATIONS

Axsys Corp; Pancake Resolvers Handbook; 2005; Axsys Technologies Inc; San Diego, CA; www.axsys.com.

(Continued)

*Primary Examiner* — Jermele M Hollington

(57) ABSTRACT

A rotatable shaft is equipped with a measurement device that generates output signals corresponding to discrete angular positions of the shaft. Rotational angles of the shaft are measured for a complete rotational period. A true angular velocity of the shaft is determined. Angular velocity is calculated between contiguous pairs of the discrete angular positions. A velocity correction is determined, and a rotational angle error term is determined based upon the velocity correction.

15 Claims, 1 Drawing Sheet

U.S. PATENT DOCUMENTS

| | | |
|---|---|---|
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0206253 A1 | 9/2005 | Hertz |
| 2005/0216225 A1 | 9/2005 | Anghel |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2005/0280320 A1 | 12/2005 | Utsumi |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |

| | | |
|---|---|---|
| 2009/0118924 A1 | 5/2009 | Heap et al. |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2010/0014072 A1* | 1/2010 | Bosselmann et al. ........ 356/73.1 |
| 2011/0282552 A1* | 11/2011 | Gebregergis et al. ........... 701/42 |

OTHER PUBLICATIONS

U.S. Appl. No. 11/743,901, filed May 3, 2007, Gleason.

* cited by examiner

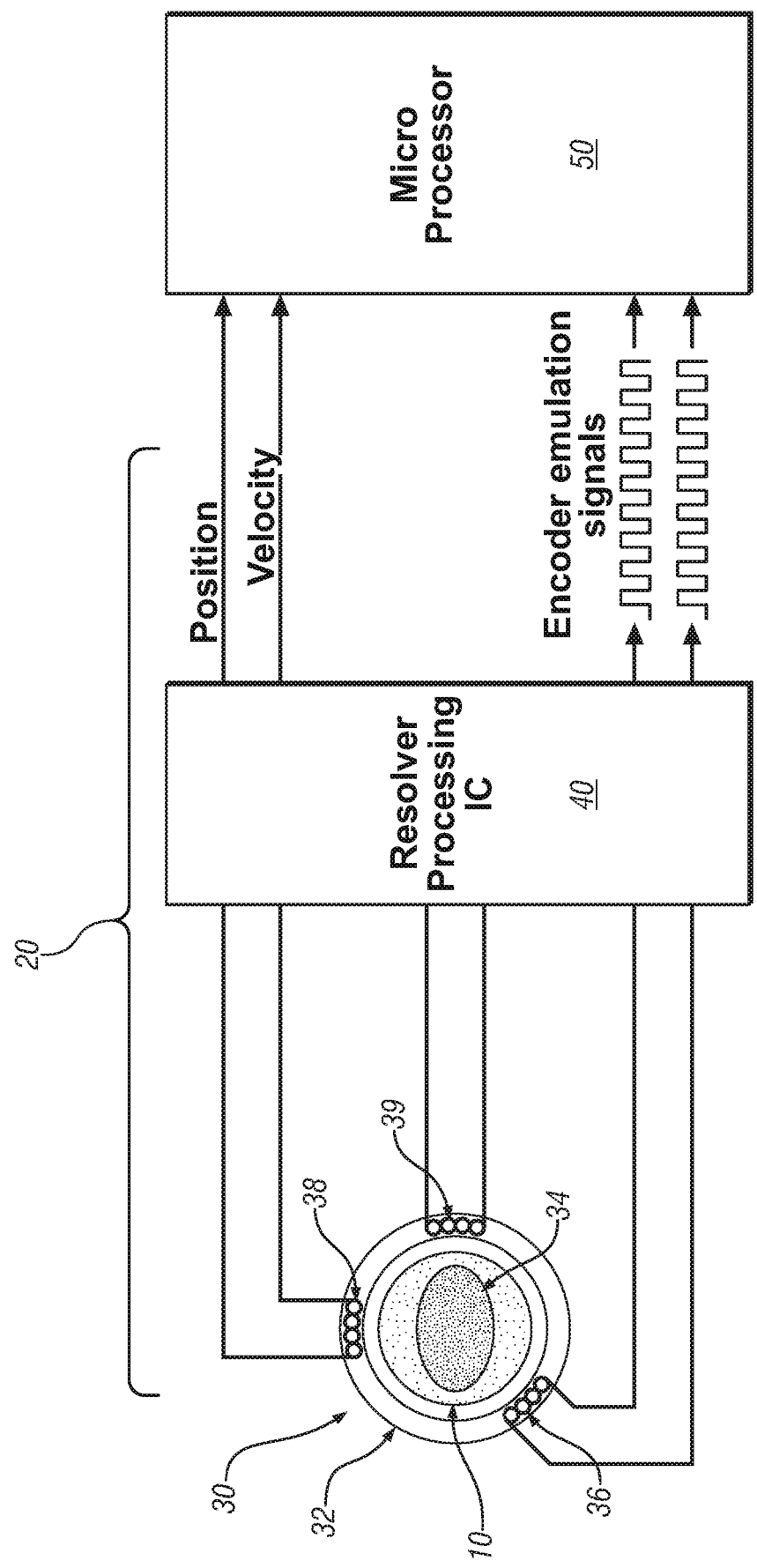

METHOD AND APPARATUS TO MONITOR POSITION OF A ROTATABLE SHAFT

CROSS REFERENCE TO RELATED APPLICATIONS

This application claims the benefit of U.S. Provisional Application No. 60/985,737 filed on Nov. 6, 2007 which is hereby incorporated herein by reference.

TECHNICAL FIELD

This disclosure pertains to monitoring position of a rotating shaft.

BACKGROUND

Control systems for rotatable devices rely upon position feedback for operational control and diagnostics. Rotational angle of the rotatable device can be measured using a rotational angle sensing system. Measurement of a true rotational angle of a rotating shaft is useful when the shaft is connected to an electric machine, e.g., a permanent-magnet synchronous electric motor.

Signal output from a rotational angle sensing system is subject to error due to factors including manufacturing variations and tolerances, including initial alignment of the sensing system during installation. Manufacturers attempt to correct errors using adjustments during assembly and post-assembly calibrations that are embedded into control systems. Manufacturers also utilize such techniques as tight machine tolerances, precision assembly methods and multiple position sensing devices to provide more accurate measures of rotational angle.

Resolver assemblies and other rotational sensing systems can provide precise measurement of the rotational angle. Known resolver devices can be used to measure rotational angle of a shaft, providing a high-resolution signal corresponding to the true rotational angle of the shaft and direction of shaft rotation. The devices are operative over a wide range of ambient temperatures, in the range of −40° C. to +125° C., thus enabling application on a broad range of systems. Applications using resolver assemblies have precise requirements for angular position and speed measurement. It is known that manufacturing variations can affect signal output of the resolver, thus affecting operation of control systems which utilize the signal output from the resolver for control and diagnostics. The accuracy of the rotational angle measurement is directly affected by the installation and mechanical alignment of the resolver.

SUMMARY

Measurement errors of angular positions of a rotatable shaft are determined by rotating the shaft and measuring the rotational angles corresponding to the discrete angular positions for a complete rotation of the shaft during which rotational speed of the shaft is substantially constant. A true angular velocity of the shaft for the complete rotation is determined and angular velocities between contiguous pairs of the discrete angular positions are calculated. A velocity correction for each of the contiguous pairs of discrete angular positions is determined and a rotational angle error term based upon the velocity correction for each of the contiguous pairs of discrete angular positions is determined.

BRIEF DESCRIPTION OF THE DRAWING

One or more embodiments will now be described, by way of example, with reference to the accompanying drawing, in which the FIGURE is a schematic diagram of a rotatable shaft and measurement system, in accordance with the present disclosure.

DETAILED DESCRIPTION

Referring now to the drawing, wherein the showings are for the purpose of illustrating certain exemplary embodiments only and not for the purpose of limiting the same, the FIGURE schematically depicts a measurement system 20 for a rotatable shaft 10 constructed in accordance with the presently described embodiments. The measurement system 20 and shaft 10 are applicable to components and systems which employ rotatable mechanical shafts including, e.g., electric motors.

The measurement system 20 comprises a resolver assembly 30 that is operatively and signally connected to an integrated circuit ('Resolver Processing IC') 40. The resolver assembly 30 comprises a variable reluctance device including a resolver stator 32 and a resolver rotor 34. The resolver rotor 34 is concentrically fixedly connected to the shaft 10 and rotates therewith. The resolver rotor 34 is appropriately positioned and assembled on the shaft 10 including a notch (not shown) oriented at magnetic or true north within manufacturing tolerances for orientation. The resolver rotor 34 comprises a rotating device having a plurality of lobes, or eccentricities, located on the outer circumference. In the system shown in the FIGURE, the resolver rotor 34 shows two lobes, but the resolver assembly 30 can use other quantities of lobes. The resolver stator 32 is preferably fixedly mounted to a housing (not shown) in which the shaft 10 rotates, e.g., to a motor housing. The resolver stator 32 includes a primary, excitation transformer 36 comprising an inductive coil, and a pair of secondary, receiving transformers 38 and 39 comprising pickup inductive coils. The secondary transformers 38 and 39 are preferably placed such that their longitudinal axes are at right angles to one another to generate signal outputs comprising sine and cosine functions. The resolver assembly 30 comprises a single speed device having one pole-pair in the embodiment depicted in the FIGURE.

The integrated circuit 40 preferably comprises a dedicated electronic device adapted to interact with the resolver assembly 30, including being electrically connected to the primary transformer 36 and signally connected to the secondary transformers 38 and 39. An excitation signal, comprising a sinusoidal voltage, is generated by an element of the integrated circuit 40 and communicated to the primary transformer 36. The application of the excitation signal to the primary transformer 36 induces output signals in the secondary transformers 38 and 39 which correspond to the rotational angle of the resolver rotor 34. The output signals of the secondary transformers 38 and 39 are monitored and analyzed by an analytical element in the integrated circuit 40. In operation, when the excitation signal to the primary transformer 36 is represented by a mathematical function, e.g., $\mathrm{Sin}(2\pi F_e t)$, the induced output signals in the secondary transformers 38 and 39 can be represented by the mathematical functions $\mathrm{Cos}(\theta)\mathrm{sin}(2\pi F_e t)$ for the secondary transformer 38 and $\mathrm{Sin}(\theta)\mathrm{sin}(2\pi F_e t)$ for the secondary transformer 39, wherein θ represents the measured rotational angle of the resolver rotor 34, and $F_e$ is based upon the frequency of the excitation signal to the primary transformer 36. Thus, the secondary transformers 38 and 39 are excited by the excitation signal from the primary transformer 36 and generate signals readable by the integrated circuit 40 at the same frequency as the excitation signal. The magnitude of the voltage levels output from the secondary transformers 38 and 39 are dependent upon the proximity of the lobed resolver rotor 34 to the resolver stator 32.

The integrated circuit 40 includes circuitry operative to convert the signals from the secondary transformers 38 and 39 to output signals corresponding to the measured rotational angle ('Position') and angular velocity ('Velocity') of the resolver rotor 34 and the shaft 10. The measured rotational angle of the resolver rotor 34 is represented as $\hat{\theta}$, and rotational angle of the shaft 10 or true angular position is represented as $\theta$. The integrated circuit 40 further preferably generates encoder emulation signals ('Encoder emulation signals'), depicted as having square wave outputs, from which direction of rotation of the shaft 10 can be determined. The output signals of the integrated circuit 40 are input to a microprocessor ('Microprocessor') 50, as shown, or another device, and provide measured rotational angles of the shaft 10 that are quantized to N discrete angular positions.

The integrated circuit 40 preferably includes a microprocessor or central processing unit, storage mediums comprising non-volatile memory devices comprising electrically programmable read only memory and read only memory, random access memory, a high speed clock, analog to digital and digital to analog conversion circuitry, and input/output circuitry and devices with appropriate signal conditioning and buffer circuitry. A set of algorithms comprising resident program instructions and calibrations are stored in one of the memory devices and executed to determine the measured rotational angle and measured angular velocity of the resolver rotor 34 and generate the encoder emulation signals from which direction of rotation of the shaft 10 can be determined. The microprocessor 50 preferably comprises a general-purpose digital computer comprising a microprocessor or central processing unit, storage mediums comprising read only memory, random access memory, electrically programmable read only memory, high speed clock, analog to digital and digital to analog circuitry, and input/output circuitry and devices and appropriate signal conditioning and buffer circuitry.

An executable program is preferably stored in one of the memory devices of the microprocessor 50 and comprises resident program instructions and calibrations operative to determine a rotational angle error of the resolver assembly 30, based upon the measured rotational angle ($\hat{\theta}$) of the resolver rotor 34, preferably based upon the equations and analysis described herein. The rotational angle error can be used in a control scheme to correct errors related to position and velocity measurements of the shaft 10. The program is executed during ongoing operation of the system to which it is applied. The program comprises monitoring the rotational angle and the angular velocity from the integrated circuit 40. Specifically, the output from the integrated circuit 40 comprises the measured rotational angle ($\hat{\theta}$) and the angular velocity of the resolver rotor 34, quantized at the N discrete angular positions, as previously described. The terms k and j represent a contiguous pair of discrete angular positions in the set of N discrete angular positions [1 ... N] of the measurement system 20. An estimate of velocity between the discrete angular positions k and j is calculated by dividing the measured angular change from position k to position j by the elapsed time of rotation from the position k to the position j. Because the position measurements have fixed errors, the measured velocity also has a fixed error. The overall analysis is based upon Eqs. 1-3 as set forth below.

$$\hat{W}_{kj} = \frac{(\theta_k + e_k) - (\theta_j + e_j)}{\Delta T} \quad [1]$$

$$\hat{W}_{kj} = \frac{(\theta_k - \theta_j)}{\Delta T} \cdot \left(1 + \frac{(e_k - e_j)}{(\theta_k - \theta_j)}\right) \quad [2]$$

$$\hat{W}_{kj} = W_{kj} \cdot \left(1 + \frac{N \cdot (e_k - e_j)}{360° \cdot (k - j)}\right) = W_{kj} \cdot (1 + \alpha_{kj}) \quad [3]$$

In the Eqs. 1, 2, and 3, the term $W_{kj}$ represents a correct average velocity between the discrete angular positions k and j, $\hat{W}_{kj}$ represents the measured angular velocity between the discrete angular positions k and j, the angles $\theta_k$ and $\theta_j$ represent the true angular positions of the discrete angular positions k and j, $e_k$ and $e_j$ represent errors at the discrete angular positions k and j, and $\Delta T$ represents elapsed time between the discrete angular positions k and j. The term $(\theta_k + e_k)$ represents $\hat{\theta}_k$, i.e., the measured angular position at the position k. The term $\alpha_{kj}$ represents the change in the rotational angle error between positions k and j, scaled by a known constant.

During operation, the resolver assembly 30 of this embodiment is operative to distinguish sixty four (64) discrete positions, i.e., N=64 for each rotation of the resolver assembly 30. The integrated circuit 40 is operative to accurately measure elapsed time between each of the discrete angular positions, and execute algorithms related thereto. Values for the measured angular velocity $\hat{W}_{kj}$ are calculated and stored for each position change for one rotational period, e.g., for the elapsed time for a single rotation of the resolver assembly 30. Thus, as the discrete angular position k ranges from 1 to 64, the measured angular velocity $\hat{W}_k$ between contiguous discrete angular positions k and k−1 can be written and determined as set forth in Eq. 4 as follows.

$$\hat{W}_k = \frac{\hat{\theta}_k - \hat{\theta}_{k-1}}{T_k - T_{k-1}} \quad [4]$$

wherein $\hat{\theta}_k$ and $\hat{\theta}_{k-1}$ comprise the measured angles at the discrete angular positions k and k−1 and $T_k$ and $T_{k-1}$ are the corresponding times at the discrete angular positions k and k−1. The values for the measured angular velocities for one rotational period can be used to determine an average measured angular velocity for one complete rotational period, calculated as set forth in Eq. 5 as follows.

$$\frac{1}{64} \sum_{j=1}^{64} \hat{W}_j \quad [5]$$

Operation of the system is monitored to determine when the average measured angular velocity calculated for one complete rotational period is substantially a constant value for the complete rotational period, with any variation in the measured angular velocity being within measurement error of the measurement system 20. The average measured angular velocity can be checked by comparing the last measured angular velocity with the first measured angular velocity for the complete rotational period. When it is determined that the average measured angular velocity is substantially constant over the complete rotational period during which the data is collected, the average measured angular velocity for the rotational period is set, and the data for the complete rotational period is captured. In the following analysis, the angular velocity $\hat{W}_k$ represents the velocity between contiguous discrete angular positions k and j, as j ranges from 1 to 64. The scale factor $\alpha_k$ due to angular position error is calculated in Eq. 6 as set forth below.

$$\alpha_k = \frac{\hat{W}_k}{\frac{1}{64}\sum_{j=1}^{64}\hat{W}_j} - 1 \qquad [6]$$

A second scale factor, $\beta_k$, can be determined therefrom for each position k, as in Eq. 7 set forth below.

$$\beta_k = 1 + \alpha_k = \frac{\hat{W}_{kj\_rot\_per}}{\frac{1}{64}\sum_{j=1}^{64}\hat{W}_j} \qquad [7]$$

The second scale factors $\beta_k$ are filtered to reduce any effect due to random noise that can occur during ongoing operation, as in Eq. 8 set forth below.

$$\overline{\beta}_k = \overline{\beta}_k + c \cdot (\beta_k - \overline{\beta}_k) \qquad [8]$$

The second scale factors $\beta_k$ are adjusted to prevent unwanted scaling of angular velocity correction, as in Eq. 9 set forth below.

$$\overline{\beta}_k = \frac{\overline{\beta}_k}{64}\sum_{1}^{64}\frac{1}{\overline{\beta}_k} \qquad [9]$$

The angle error $e_k$ for each of the discrete angular positions k is determined, as in Eq. 10 set forth below.

$$e_k = \frac{360°}{64}\sum_{1}^{k}(\overline{\beta}_j - 1) \qquad [10]$$

The constant of integration can be removed to determine the rotational angle error $e_k$ as in Eq. 11 set forth below.

$$e_k = e_k - \sum_{1}^{64}\frac{e_j}{64} \qquad [11]$$

The true rotational angle $\theta_k$ and the true angular velocity W can be determined based upon the measured rotational angle and angular speed and the rotational angle error and the scaling factor, as in Eq. 12 as set forth below.

$$\theta_k = \hat{\theta}_k - e_k \qquad [12]$$
$$W = \frac{\hat{W}_k}{\overline{\beta}_k}$$

In an alternate embodiment, determining individual angular positions from each of the N discrete angular positions may not be practical due to magnitude of the data and the related analysis. Thus, the 360 degrees of each rotation of the resolver assembly 30 can be partitioned into 64 discrete fields, or buckets, with measurements made within each of the buckets being averaged. The executable program described with reference to Eqs. 1-12 can then be applied to the same effect. This may be necessary in applications wherein the resolver assembly 30 is constructed of multiple pole pairs, resulting in corresponding multiple resolver cycles for each rotation of the shaft 10. Thus, the measurement system 20 and the executable program described is applicable to resolver assemblies having multiple pole-pairs, and to other devices adapted to measure rotational speeds. The rotational angle error term $e_k$ is preferably stored in one of the non-volatile memory devices within the microprocessor 50 for each measurement system used, for use in control and operation. When the shaft 10 is an element of an electric motor (not shown), the microprocessor can use the true rotational angle $\theta_k$ and the angular velocity W to control electrical energy input to each of the coils of a motor stator to optimize electric energy efficiency.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring rotational position of a rotatable shaft, comprising:
   generating output signals corresponding to a plurality of discrete rotational angles of the shaft;
   monitoring the output signals and elapsed times corresponding to the discrete rotational angles of the shaft for a complete rotation during which rotational speed of the shaft is substantially constant;
   determining a true angular velocity of the shaft for the complete rotation during which the rotational speed of the shaft is substantially constant;
   calculating angular velocities between contiguous pairs of the discrete rotational angles;
   determining a velocity correction based upon the calculated angular velocities and the true angular velocity;
   determining an error in measurement of the rotational angle of the shaft based upon the velocity correction; and
   determining a rotational angle error term combinable with the discrete rotational angles of the shaft.

2. The method of claim 1, wherein angular velocities are calculated between contiguous pairs of the discrete rotational angles for the complete rotation of the shaft, and wherein a velocity correction is determined for each of the contiguous pairs of discrete rotational angles.

3. The method of claim 2, wherein a rotational angle error term is determined for each of the contiguous pairs of discrete angular positions.

4. The method of claim 2, wherein velocity corrections are determined by dividing each of the calculated angular velocities by a mathematical average of the calculated angular velocities between contiguous pairs of the discrete rotational angles for the complete rotation of the shaft.

5. The method of claim 1, further comprising correcting the discrete rotational angles of the shaft based upon the rotational angle error terms.

6. The method of claim 1, further comprising equipping the shaft with a measurement device operative to generate the output signals corresponding to the plurality of discrete rotational angles of the shaft.

7. The method of claim 6, comprising determining the rotational angle error term for the measurement device based upon the velocity correction.

8. Method for measuring a true rotational angle of a rotatable shaft, comprising:
   fixedly attaching a resolver rotor to the shaft;
   providing a resolver stator to generate a resolver stator signal corresponding to rotational angles at discrete angular positions of the rotor;
   rotating the shaft and monitoring the resolver stator signal;
   measuring the rotational angles and elapsed times therebetween for a complete rotation of the shaft during which rotational speed of the shaft is substantially constant;
   determining a true angular velocity of the shaft for the complete rotation during which the rotational speed of the shaft is substantially constant;
   calculating an angular velocity between contiguous pairs of the discrete angular positions for the complete rotation of the shaft;
   determining a velocity correction between the calculated angular velocity and the true angular velocity;
   determining a rotational angle error term based upon the velocity correction; and
   correcting the measured rotational angle with the rotational angle error term.

9. The method of claim 8, wherein a velocity correction is determined for each of the contiguous pairs of discrete rotational angles.

10. The method of claim 9, wherein the rotational angle error term is determined for each of the contiguous pairs of discrete angular positions.

11. The method of claim 8, comprising determining the velocity correction by dividing each of the calculated angular velocities by a mathematical average of the calculated angular velocities between each of the contiguous pairs of the discrete angular positions for the complete rotation.

12. The method of claim 11, further comprising measuring rotational angles of the shaft corresponding to the discrete angular positions for a plurality of complete rotations during which the rotational speed of the shaft is substantially constant.

13. Method to determine an error in measurement of an angular position of a rotatable shaft, comprising:
   determining rotational angles corresponding to discrete angular positions of the shaft;
   rotating the shaft and measuring the rotational angles corresponding to the discrete angular positions for a complete rotation of the shaft during which rotational speed of the shaft is substantially constant;
   determining a true angular velocity of the shaft for the complete rotation during which rotational speed of the shaft is substantially constant;
   calculating angular velocities between contiguous pairs of the discrete angular positions for the complete rotation of the shaft;
   determining a velocity correction between the calculated angular velocity and the true angular velocity for each of the contiguous pairs of discrete angular positions; and
   determining a rotational angle error term based upon the velocity correction for each of the contiguous pairs of discrete angular positions.

14. The method of claim 13, wherein the velocity corrections are determined by dividing each of the calculated angular velocities by a mathematical average of the calculated angular velocities between each of the contiguous pairs of the discrete angular positions for the complete rotation.

15. The method of claim 14, further comprising correcting the measured rotational angles of the shaft based upon the rotational angle error terms.

* * * * *